Figure 1:
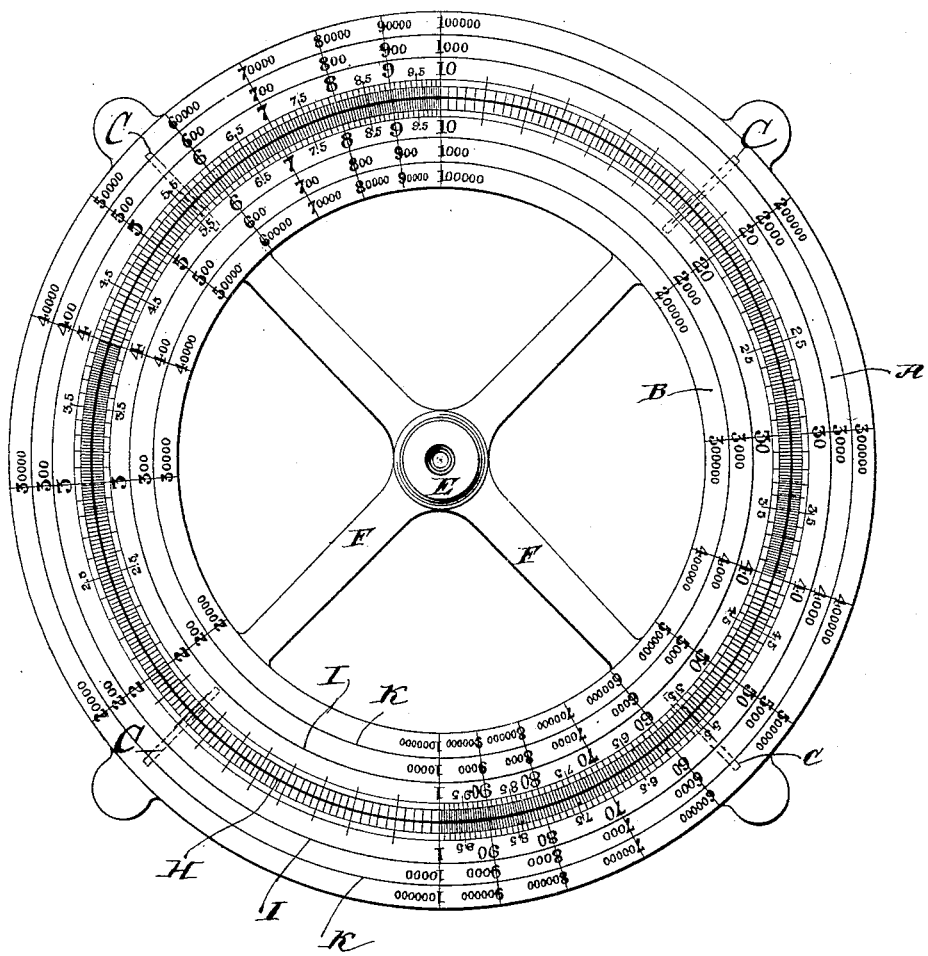

(No Model.)

W. HART.
LOGARITHMIC SLIDING SCALE.

No. 387,070. Patented July 31, 1888.

WITNESSES:
Frank E. Hartley.
Frank B. Murphy.

INVENTOR.
Walter Hart,
BY
Duncan, Curtis, & Page,
ATTORNEYS.

UNITED STATES PATENT OFFICE.

WALTER HART, OF EAST ORANGE, NEW JERSEY.

LOGARITHMIC SLIDING SCALE.

SPECIFICATION forming part of Letters Patent No. 387,079, dated July 31, 1888.

Application filed September 28, 1887. Serial No. 250,875. (No model.)

*To all whom it may concern:*

Be it known that I, WALTER HART, of East Orange, Essex county, and State of New Jersey, have invented certain new and useful Improvements in Sliding Scales, of which the following is a full, clear, and exact description, reference being had to the accompanying drawings.

This invention relates to what are known as "engineers' sliding rules." The construction of these rules and the method of employing them are well understood in the arts to which they apply; but their most common form is as follows: Upon any straight and flat piece of wood or like suitable material is laid off the logarithmic scale subdivided decimally, and upon another piece of wood is laid off the same scale in the same manner, this second piece or member of the rule being movably secured to the first member, so that the separate scales are near each other and any part of either scale can be applied to any part of the other—that is, the scales have a parallel adjustment relative to each other. It will be understood that the graduation of these logarithmic scales is such that when a given number on one scale is made to coincide with a given number on the other the product or some other function of the two members is obtained by inspection. Thus, since all questions are reducible to proportions, the general rule for using the instrument may be stated as follows: The first term (or first antecedent) of the proportion will be found on the sliding member of the rule and placed opposite the second term (or first consequent) read from the fixed member of the rule, when the third term, (or second antecedent,) which is to be found on the sliding member, will be in line with the fourth term (or second consequent) read from the fixed member.

It will now be plain that a great many problems will occur requiring such an adjustment of the movable member of the rule as would bring the second antecedent beyond the range of the fixed scale. In order to provide for such readings it has been customary to repeat the scale upon the separate members of the rule and to continue through such second scales the subdivisions of the first scales, assigning to these subdivisions a value corresponding to such extension. By this means a direct reading can only be had for numbers increased by tenfold over those on the first half of the scales. When, however, a direct reading is desired for numbers greater than are given by the scales thus repeated, still further repetitions of the scales must be resorted to; or, as is often done, the valuation of the divisions of the two divisionally-duplicated scales are mentally increased sufficiently to include the terms of the problem. Both such methods of extension are very objectionable when problems having large or fractional terms are to be solved. To repeat the scales many times would produce an unwieldy and inconvenient instrument, while to mentally carry values for the divisions assumed for the purposes of the problem is both difficult and a possible source of error that it is desirable to obviate so far as possible.

My invention, therefore, has for its object to provide a sliding rule having its two members constructed so as to be endless, or so that the duplicate scales of either of its members shall be continuous from the first scale to the second and from the end of the second back upon the first.

The invention consists of two concentric disks movably secured together with their faces in substantially the same plane and having motion relatively about their common center, each half of each disk being filled with an inscribed logarithmic scale, the scales of either disk being subdivided and numbered in exact accordance with those of the other disk.

The invention also consists in one or more additional scales arranged in plane and concentric with and having general divisions corresponding to each of the first-named or basic scales, whereby the operative range of the basic scales is graphically instead of mentally extended.

Figure 2:
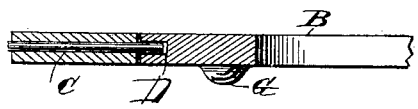

Referring to the drawings, Figure 1 is a full or plan view of a sliding rule embodying my improvements, and Fig. 2 is an enlarged cross-section of the same.

The letters A and B represent, respectively, an outer and an inner disk, of any material suitable to receive the numbers and lines forming the logarithmic scales. These disks are of about the same width, and are concentrically secured together in such manner that either is movable about its center independently of the other. This relation of the disks may be secured by various different constructions. The construction here shown consists of securing the outer disk upon the periphery of the inner disk and in the same plane by the pins C, which are fixed in the outer disk and project into a circumferential groove, D, in the inner disk. This permits the two disks to be freely moved one upon the other, while at the same time maintaining their proper relative relation. Preferably, and particularly for the convenience of handling the rule, the inner disk is provided with the common center, E, and radial parts F, the whole being supported on bosses G. The interior parts of this disk may, however, be otherwise shaped or filled in.

Upon the common line, H, between the disks, is laid off the logarithmic scale of units, this scale occupying exactly one-half of this circle, and its subdivisions for the two disks being expressed by the radial line, so that the scales of the two disks have the same independent value. Upon the other halves of the disks are duplicated the same scales, so far as extent and divisions are concerned; but their expressed value is tenfold that of the divisions of the first scale—that is, the first logarithmic scale for both or either disk represents units and the second tens. Parallel to these basic scales are lines I and K, upon the first of which are written the divisions that would represent the third and fourth extensions of the first scales— that is, hundreds for the first halves of the disks and thousands for the second halves. So, also, in accordance with the rules governing such extension of the basic scales, the lines K will be numbered with tens of thousands and hundreds of thousands. It will now be plain that the simple prolongation of the radial lines of the basic scales will produce the proper divisions of all the other scales, so that the subdivisions of the tens-of-thousands scale may be used as readily as the tens-scale, and that by a scale extended no farther than that shown by the drawings values can be read directly therefrom from one to one million. This obviously includes the range of all ordinary computations, though, of course, higher values could easily be represented upon the disks; or such values may be mentally assigned to those already inscribed thereon in the manner common to the use of the ordinary slide-rule. By this construction it will be seen that the slide-rule is made in effect an endless instrument and without limitation in its range of calculation. Furthermore, the instrument is very compact, and its circular construction facilitates the placing of the separate parts and the ready reading of the sought-for values, so that computations therewith are much more rapidly made than with the ordinary straight rule or any of its modifications.

It is an important feature of this instrument that the units or basic scales, together with one or more extensions thereof, fill the disks circularly, as also that the scales of the separate disks be alike and be located in substantially the same plane, or so that they are both visible to the operator throughout their whole extent, for by such arrangement of the scales the following advantage over any present form of sliding scale is secured: The commercial purposes that this instrument is especially adapted to consists in solving problems, groups or classes of which are based upon a common first antecedent and first consequent, or upon some other value or ratio that for a number of cases is the same. When this is so, the instrument need be set to the proper ratio but once, and from it may be then directly read all the results depending upon such common ratio. This is true in cases involving square, cubic, and other values by involution as well as values of proportion. The problems of trade, insurance, statistics, &c., can therefore be much more rapidly and conveniently solved than by any of the present forms of sliding scales.

I have described my invention as embodied in a scale in which each disk has a unit-scale and one extension thereof, as this form, it is believed, will be the most common; but I do not confine myself to this precise arrangement, as the disks may be divided into three or any other number of equal parts, each of which can be inscribed with some part or the whole of the logarithmic scale, in accordance with the method explained.

I am aware that various modifications have been made that involve a circular arrangement of the logarithmic scale or scales; but none of these do I claim, as they, so far as known to me, do not involve the principle of my invention. Thus the logarithmic scales have been extended or duplicated upon the curved surface of a cylinder turning at right angles and sliding parallel to one or more other scales. This instrument is necessarily cumbersome and costly, and only a portion of the graduated parts thereof are before the operator at any one time, and it must be set for each problem. The relative arrangement of the fixed and movable scales is radially different from that of the present invention, in that there is no possibility for continuous reading, as in the latter form. So, too, logarithmic scales have been variously inscribed upon disks arranged to revolve within a surrounding frame bearing the other scales or expressed values, or beneath movable radial cords or scales, and only adapted to computations of problems of a certain kind, such as the measurement of lumber or grain, or for chemists' use, &c.; but all these scales are especially adapted to specific use, and cannot be used for general or miscellaneous calculations, particularly as the scales of the movable and fixed parts are usually arranged with different divisions or values, and their entire circumferences are filled with differing scales usually extended to only include the longest probable calculations of a class, and in no case consist of duplicate scales marked and arranged as in the present case.

What is claimed as new is—

1. In a slide-rule, the combination of two concentrically-connected and independently-movable disks arranged in the same plane, a circle on each disk being filled with a logarithmic units-scale and one or more extensions thereof of regularly-increasing numerical value, the scales of the separate disks having the same relative divisional values, substantially as and for the purpose set forth.

2. In a slide-rule, the combination of two concentrically-connected and independently-movable disks arranged in the same plane, a circle on each disk being filled with a logarithmic units-scale and one or more extensions thereof of regularly-increasing numerical value, and one or more circles arranged concentric to the circle of the units-scale and its extension and similarly divided and of proportionately-increasing values, the scales of the separate disks having the same relative divisional values, substantially as and for the purpose set forth.

WALTER HART.

Witnesses:
ROBT. F. GAYLORD,
FRANK B. MURPHY.